US011422833B1

(12) United States Patent
Schumacher et al.

(10) Patent No.: US 11,422,833 B1
(45) Date of Patent: Aug. 23, 2022

(54) SYSTEM AND METHOD FOR AUTOMATIC GENERATION OF HUMAN-MACHINE INTERFACE IN A VISION SYSTEM

(71) Applicant: Cognex Corporation, Natick, MA (US)

(72) Inventors: David Schumacher, Natick, MA (US); Gaurav Sharma, Belmont, MA (US); Laszlo Peter, Budapest (HU); Csaba Sandor, Budapest (HU)

(73) Assignee: Cognex Corporation, Natick, MA (US)

( * ) Notice: Subject to any disclaimer, the term of this patent is extended or adjusted under 35 U.S.C. 154(b) by 268 days.

(21) Appl. No.: 15/640,392

(22) Filed: Jun. 30, 2017

(51) Int. Cl.
*G06F 17/00* (2019.01)
*G06F 9/451* (2018.01)
*H04N 5/232* (2006.01)

(52) U.S. Cl.
CPC ......... *G06F 9/451* (2018.02); *H04N 5/23293* (2013.01)

(58) Field of Classification Search
CPC .............................. G06F 9/451; H04N 5/23293
See application file for complete search history.

(56) References Cited

U.S. PATENT DOCUMENTS

| | | | | |
|---|---|---|---|---|
| 3,840,396 A | | 10/1974 | Sommerfeld et al. | |
| 5,255,363 A | * | 10/1993 | Seyler | G06F 3/0489 715/219 |
| 5,623,591 A | * | 4/1997 | Cseri | G06F 3/0481 715/762 |
| 5,721,847 A | * | 2/1998 | Johnson | G06F 3/0481 715/823 |
| 5,734,597 A | * | 3/1998 | Molnar | G06F 9/451 715/764 |
| 5,880,742 A | * | 3/1999 | Rao | G06F 3/023 345/440 |
| 5,983,268 A | * | 11/1999 | Freivald | G06F 16/957 709/218 |
| 6,138,130 A | * | 10/2000 | Adler | G06F 17/243 715/209 |

(Continued)

FOREIGN PATENT DOCUMENTS

| | | |
|---|---|---|
| JP | 2000259400 A | 9/2000 |
| JP | 2002258909 A | 9/2002 |

(Continued)

*Primary Examiner* — Mohammed H Zuberi
(74) *Attorney, Agent, or Firm* — Loginov & Associates, PLLC; William A. Loginov

(57) ABSTRACT

The invention provides a system and method that automatically generates a user interface (HMI) based on a selection of spreadsheet cells. The spreadsheet controls operations within the processor(s) of one or more vision system cameras. After selecting a range of cells in the spreadsheet, the user applies the system and method by pressing a button, or using a menu command that results in an automatically generated HMI with appropriate scaling of interface elements and a desired layout of such elements on the associated screen. Advantageously, the system and method essentially reduces the user's workflow to two steps, selecting spreadsheet cells and generating the HMI around them. The generated HMI runs in a web browser that can be instantiated on a user device, and communicates directly to a vision system processor(s). Data can pass directly between the user interface running in a web browser and the vision system processor(s).

19 Claims, 19 Drawing Sheets

(56) References Cited

U.S. PATENT DOCUMENTS

| | | | | |
|---|---|---|---|---|
| 6,859,907 B1* | 2/2005 | McGarry | G06Q 10/06 | 715/201 |
| 7,107,519 B1* | 9/2006 | Webster | G06F 40/18 | 715/212 |
| 7,389,208 B1 | 6/2008 | Solinsky | | |
| 7,467,350 B2* | 12/2008 | Aureglia | G06F 17/246 | 715/212 |
| 7,603,652 B2* | 10/2009 | Makowski | G06F 30/3312 | 717/109 |
| 7,612,661 B1 | 11/2009 | Johnson et al. | | |
| 7,797,141 B2 | 9/2010 | O'Connell et al. | | |
| 7,844,911 B2 | 11/2010 | Austin et al. | | |
| 8,117,588 B2* | 2/2012 | Kornerup | G06F 8/34 | 717/109 |
| 8,151,213 B2* | 4/2012 | Weitzman | G06F 17/246 | 715/810 |
| 8,276,150 B2* | 9/2012 | Chavoustie | G06F 9/4843 | 715/212 |
| 8,577,704 B2* | 11/2013 | Cannon | G06F 17/246 | 705/7.11 |
| 8,793,567 B2* | 7/2014 | Velingkar | G06F 16/20 | 715/220 |
| 8,892,644 B2* | 11/2014 | Holland | G06F 17/2288 | 709/204 |
| 9,123,093 B1* | 9/2015 | Schumacher | G06F 8/34 | |
| 9,135,233 B2* | 9/2015 | Fan | G06F 17/246 | |
| 9,501,453 B2* | 11/2016 | Gasn | G06F 16/972 | |
| 9,672,200 B1* | 6/2017 | Krappe | G06F 17/246 | |
| 10,031,904 B2* | 7/2018 | Cuomo | G06F 16/93 | |
| 10,061,473 B2* | 8/2018 | Doan | G06F 3/0482 | |
| 10,180,933 B2* | 1/2019 | Chavoustie | G06F 17/246 | |
| 10,303,757 B2* | 5/2019 | Hvezda | G06F 9/451 | |
| 10,444,005 B1* | 10/2019 | Dryer | G06F 3/04815 | |
| 2002/0131633 A1* | 9/2002 | Zwick | G06T 7/0004 | 382/152 |
| 2002/0186245 A1* | 12/2002 | Chandhoke | G05B 19/0426 | 715/764 |
| 2004/0030435 A1* | 2/2004 | Popp | G06Q 50/06 | 700/110 |
| 2004/0030438 A1* | 2/2004 | Popp | B65H 23/1882 | 700/122 |
| 2005/0204333 A1 | 9/2005 | Denby et al. | | |
| 2007/0168943 A1* | 7/2007 | Marini | G06F 8/34 | 717/108 |
| 2008/0122799 A1* | 5/2008 | Pryor | G06F 3/0488 | 345/173 |
| 2009/0089394 A1* | 4/2009 | Krueger | G06F 15/16 | 709/216 |
| 2009/0113337 A1* | 4/2009 | Rogers | G06F 8/34 | 715/781 |
| 2011/0041067 A1* | 2/2011 | Olson | G06F 9/451 | 715/738 |
| 2012/0303666 A1 | 11/2012 | Freed | | |
| 2013/0246932 A1 | 9/2013 | Zaveri et al. | | |
| 2016/0080205 A1* | 3/2016 | Brown | H04N 17/002 | 709/220 |
| 2017/0132194 A1 | 5/2017 | Lee | | |

FOREIGN PATENT DOCUMENTS

| | | |
|---|---|---|
| JP | 2004171282 A | 6/2004 |
| KR | 20040070266 A | 8/2004 |

* cited by examiner

SYSTEM AND METHOD FOR AUTOMATIC GENERATION OF HUMAN-MACHINE INTERFACE IN A VISION SYSTEM

FIELD OF THE INVENTION

This invention relates to machine vision systems and interfaces for the same and more particularly to interfaces that employ a spreadsheet format to provide inputs and outputs to the vision system.

BACKGROUND OF THE INVENTION

Machine vision systems (also termed herein "vision systems") that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or remote, interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code. In other types of vision systems, various vision system tools (e.g. edge detectors, calipers, blob analysis) are employed by the system processor to detect edges and other features that allow for recognition of object features, and the determination of desired information based upon these features—for example whether the object is defective, or whether it is properly aligned. Vision systems can also be used to control various processes—for example moving a robot manipulator/motion stage or gating objects on a moving (e.g. conveyor) line, such as defective part rejection.

In many vision system processes the initial setup is performed by a user, employing an interface that characterizes various vision system tool settings, camera parameters, inputs and outputs. For example, the interface can specify a type of tool to use to analyze an object in an imaged scene and image display a window of the results for the operator, including an enhanced image of the object under inspection. All of these parameters and settings are generally defined by the user at setup. One common form of setup too for creating the user interface for a specific vision system application is based upon a spreadsheet format, in which various settings, parameters buttons and image display windows are laid out by the user in a series of spreadsheet cells. The resulting human-machine (graphical) interface (HMI) is generated by the parameters entered in the spreadsheet. By way of non-limiting example, a spreadsheet-based interface system is shown and described in commonly assigned U.S. Pat. No. 7,107,519, entitled SPREADSHEET-BASED USER INTERFACE CREATION, issued Sep. 12, 2006, the teachings of which are incorporated herein by reference as useful background information.

The process of the generating an HMI using a spreadsheet can be tedious, involving a number of manual steps, such as the scaling and layout of the elements on the interface (e.g. image display windows, labels, data boxes), and the linking of elements to various cells that contain information relevant to the particular element of the HMI. These manual setup steps can be time-consuming, and thus, costly for a vision system operator.

SUMMARY OF THE INVENTION

The invention overcomes disadvantages of the prior art by providing a system and method that automatically generates a user interface (HMI) based on a selection of spreadsheet cells. The spreadsheet controls operations within the processor(s) of one or more vision system cameras. After selecting (i.e. highlighting) a range of cells in the spreadsheet, the user applies the system and method by pressing a button, or using a menu command that results in an automatically generated HMI with appropriate scaling of interface elements and a desired layout of such elements on the associated screen. Advantageously, the system and method essentially reduces the user's workflow to two steps, selecting spreadsheet cells and generating the HMI around them independent of the number and type of the cells, thus substantially simplifying the task of user interface creation. The generated HMI is fully functional, in that it can contain interactive elements, and all data is live (as the application executes, data changes in the spreadsheet are automatically propagated to the HMI). The generated HMI runs in a web browser that can be instantiated on a user device (e.g. PC, laptop, tablet, smartphone, etc.), and communicates directly to a vision system processor(s). Data can pass directly between the user interface running in a web browser and the vision system processor(s). This data can be images, values, graphics, etc.

In an exemplary embodiment, a system and method for use in automatically generating a human-machine interface (HMI) in a vision system having one or more cameras is provided. The system and method includes an HMI generator responsive to a spreadsheet having a standard cell region, with a plurality of standard cells displayable and accessible as standard spreadsheet cells. The cells each correspond to an HMI element. Illustratively, a vision system controller is interconnected over a first network between a processor of the one or more cameras that operate based upon the spreadsheet. The vision system controller can be linked to one or more user devices that display the HMI to a user. The user devices can be linked to the vision system controller via a second network and/or the first network comprises a local camera network and the second network comprises a separate, user-related network. The vision system controller can select an appropriate communication protocol to communicate with the processor of the one or more cameras. Illustratively, the HMI includes user interface elements that enable at least one of (a) data changes in a vision system application, (b) invocation of other procedures that the vision system application provides, and (c) a data screen. The data screen can have image and graphics data that updates as the vision system application executes. Illustratively, the spreadsheet cells can have multiple element types, including at least one of images, simple data values, and control constructs. The HMI can be displayed in a web browser of a user device, and/or data from the vision system is automatically sent to the HMI. Typically, a user input to the HMI is sent to the vision system, and images from the one or more cameras are automatically displayed and scaled to fit inside a screen control on the HMI. In various embodiments, results of the vision system from vision tools are graphically drawn in the screen control on the HMI. The HMI generator can be arranged to generate metadata associated with the HMI element.

BRIEF DESCRIPTION OF THE DRAWINGS

The invention description below refers to the accompanying drawings, of which.

DETAILED DESCRIPTION

I. System Overview

Figure 1:
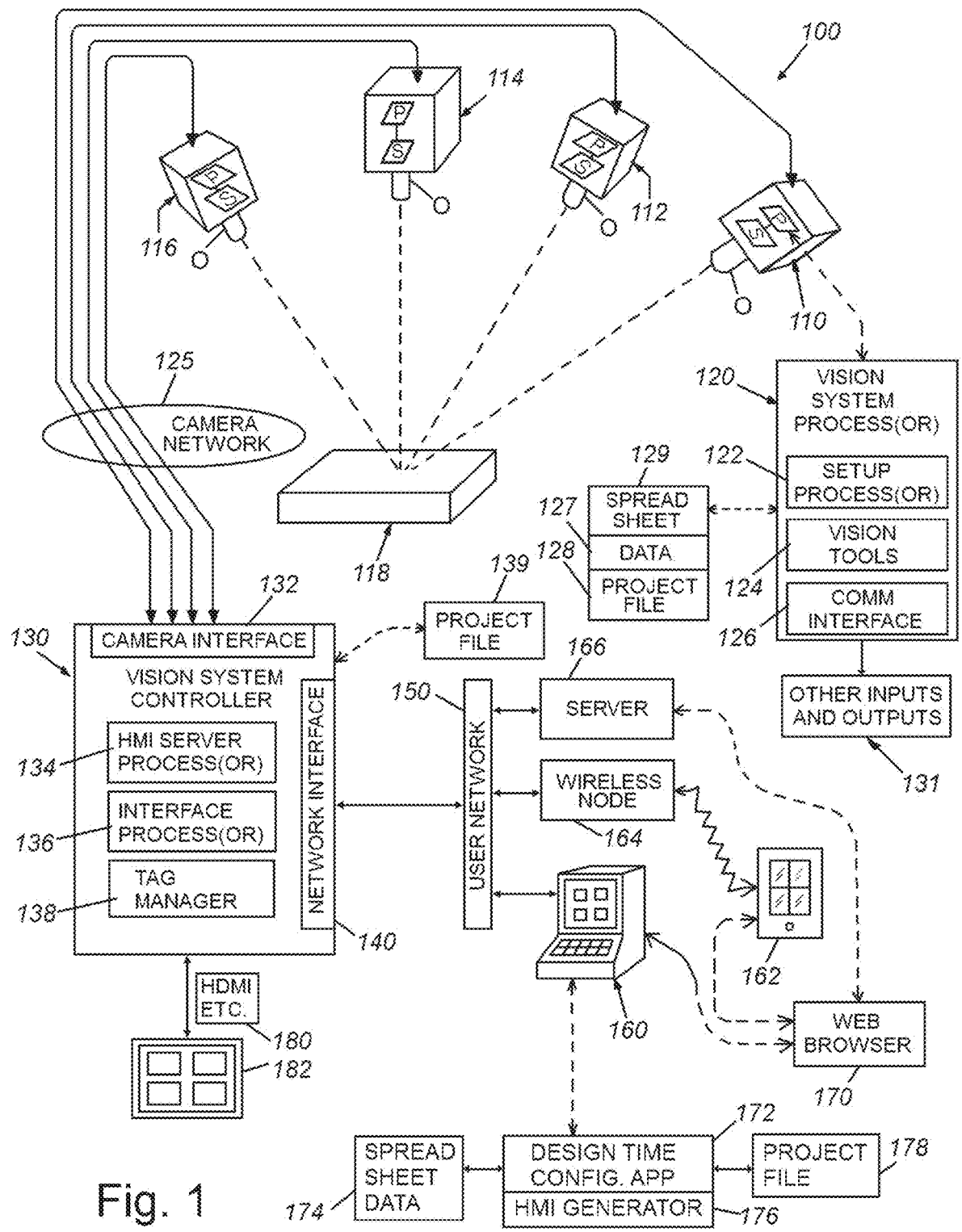
FIG. 1 is a diagram of an overall vision system arrangement employing an vision system controller and HMI server interconnected with one or more user interface devices and a plurality of vision system camera's according to an exemplary embodiment.

FIG. 1 is a diagram showing an overview of an exemplary vision system arrangement according to an embodiment. The arrangement 100 includes one or more (e.g. four) vision system camera(s) 110, 112, 114 and 116 arranged with respect to one or more objects of interest 118. The camera(s) 110, 112, 114 and 116 can be configured in any appropriate manner to acquire and process image data for any appropriate vision system purpose—for example, inspection, alignment, identification, etc. The camera(s) can be 1D, 2D or 3D and the underlying object and camera(s) can be stationary with respect to each other or in relative motion (e.g. via a conveyor, motion stage, robot manipulator, etc.). Each camera includes an image sensor S that converts received light via the camera optics O into pixel data. This pixel data is transmitted to a processor P as a series of image frames. The processor P can be fully enclosed within the camera body, as shown, or partially or fully instantiated on a remote device interconnected by a wired or wireless data link. In this embodiment, each camera includes an onboard processor with vision system functionality. The block 120 shows the exemplary vision system processor P, and related vision system processes, associated with the exemplary camera 110 in further detail. Each camera (110, 112, 114 and 116) can have a similar or identical processor arrangement. Among other functions (which should be clear to those of skill) for the purposes of this description, the processor P includes a setup process(or) 122 that interacts with the HMI described herein and applies appropriate controls and parameters (typically in pre-runtime and/or during system training time) to the vision tools 124 that operate within the process(or) to analyze acquired images. The data input to the processor from a user and output to the user are handled by a communication interface 126. In this embodiment, the communication interface can be organized to use an appropriate communication protocol (e.g. TCP/IP) to communicate over an internal (local) camera network 125 with internal IP addresses with a vision system controller 130 that operates an associated HMI server 134. The processor P can also receive input information directly from external devices and output information (block 131) directly to such devices—for example, trigger signals, illumination controls, motion encoder signals and robot/event control signals—in a manner separate from the local camera network 125.

The processor P is controlled using a stored project file 128 that is arranged based upon cells of a control spreadsheet 129. The spreadsheet 129 and its associated data 127 (which can include a project file for a specific task and/or HMI configuration) resides on the processor P in an exemplary embodiment. In alternate embodiments, other control arrangements can reside within the processor P and the spreadsheet (communicating with the control of the processor P) can be instantiated on a remote device and/or processor that is linked to the processor P. Note that the spreadsheet in this example can be presented in any acceptable format to the user. It can be based on or mimic a commercially available spreadsheet application or can be a proprietary application/GUI. The spreadsheet can be considered to be a "control spreadsheet" or a "vision system spreadsheet".

The vision system controller 130 includes a camera interface 132 that is linked to each of the camera's 110, 112, 114 and 116. The interface governs transmission of data to and from each camera. The data transfer is handled within an HMI server process(or) 134. As with other processors described herein, it can be operatively connected to working memory (e.g. DRAM) and/or data storage (e.g. Flash, hard drives, etc.) in a manner clear to those of skill. The vision system controller 130 also includes an interface processor 136 that, in conjunction with an HMI generation process(or) 138 (or collectively termed an "HMI generator"), interacts with user devices on a user (factory) network 150 via an interface 140. The interaction between devices is described further below. In general, the HMI server 134 provides data in a form/protocol that camera processors can employ and receives such data from the camera processors. The vision system controller 130 interacts with data generated on user devices (for example PCs/laptops 160, handheld smartphones/tablets 162 (via e.g. wireless nodes 164) and servers 166), and facilitates the automatic creation of an HMI from spreadsheet information displayed on the user device web browser 170. As described further below, the vision system controller 130 includes a tag manager or process(or) 138 that handles tags created by the system for use in the vision system tool block in connection with various HMI elements.

In an exemplary embodiment, the user device 160 includes a design time configuration application or process 172. This application is used to create the HMI using the spreadsheet and associated spreadsheet data 174. The application 172 includes an HMI generator, which is responsible for converting spreadsheet data into HMI elements in an automated process. The HMI generator 176 communicates with the manager 138 that resides on the vision system controller 130 in this example. The result of HMI generation (and associated tag creation) is the project file, that can be stored on the camera (file 128), the controller (file 139) and/or the user device 178. The project file contains the parameters used to configure the HMI on the user device and to operate the controlling spreadsheet 129 on the camera. In general, the HMI can be used to control the camera(s) and/or display information from the camera(s) in a manner that is convenient for the user.

The vision system controller 130 allows various additional interconnections with devices—for example, it can be adapted to receive external inputs and send external outputs in the manner of above-described block 129. The controller 130 includes a display monitor link (e.g. an HDMI or similar) 180 that allows interconnection with a local monitor 182. More generally, the vision system controller 130 allows the spreadsheet operating on the camera(s) to be manipulated directly by the user on the user device, with the information relayed over the local and user networks by the controller.

II. Manual Procedure

Figure 2:
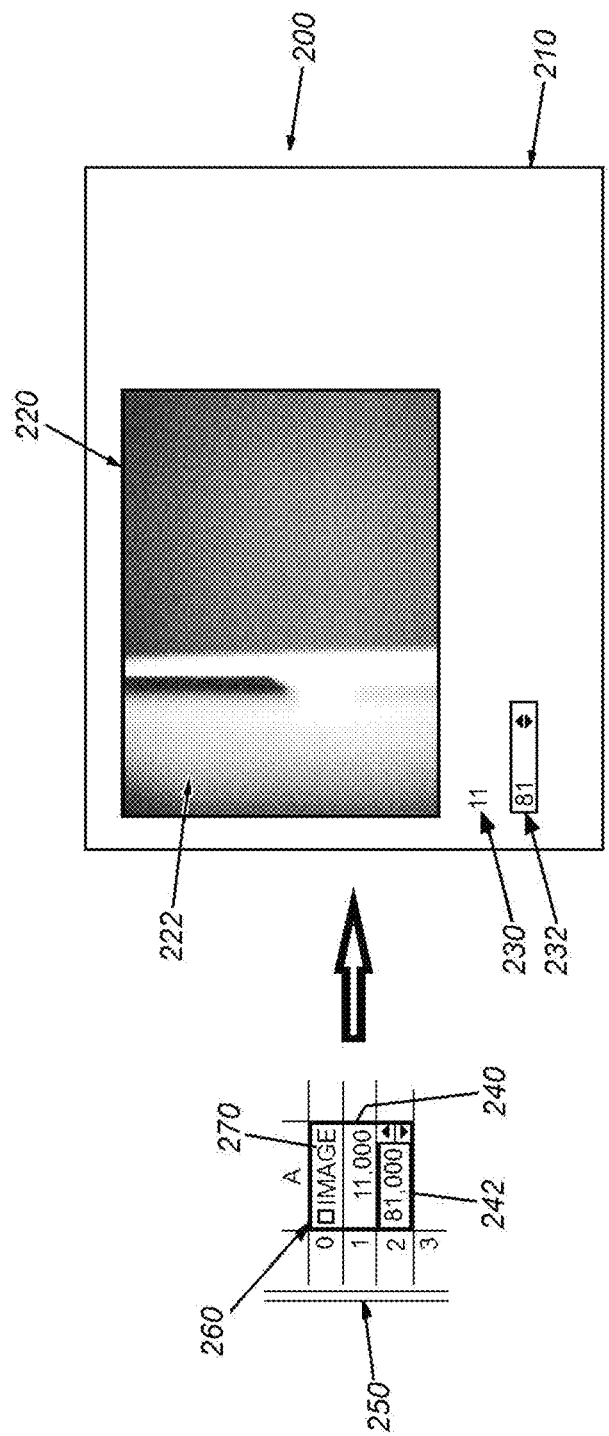
FIG. 2 is a diagram showing an exemplary graphical user interface (GUI) screen on a user interface device with a partial view of spreadsheet cells and an associated HMI element driven by the cells, in which the cells are updated according to a prior approach.

FIGS. 2-8 depict a manual technique for generating an HMI for use in a vision system according to an existing implementation of the system setup process. This description is provided by way of background example to illustrate the steps generally required to handle cells in a spreadsheet. By way of example, FIG. 2 shows a screen 200 of an HMI that is projected to the user over an appropriate communication link from (e.g.) the processor of a vision system camera. The overall HMI screen defines border 210 (typically corresponding with the edges of the screen or a letter box within the screen), and includes a projection of an exemplary, acquired image of an object 222 within an image display window 220. The overall screen 220 contains numeric controls 230 and 232 in boxes located below the display window. The upper box 230 shows an integer value "11" in this example and the lower box 232 shows a spinner box with a value of "81". These HMI boxes 230 and 232 correspond to cells 240 and 242, respectively within the cell grouping 250 of the spreadsheet 260. This grouping includes the name "Image" 270, which defines a related HMI function recognized by the setup application of the vision system. In the example of FIGS. 2-8, the goal is to update the value of the control in the HMI via the spreadsheet.

Figure 3:
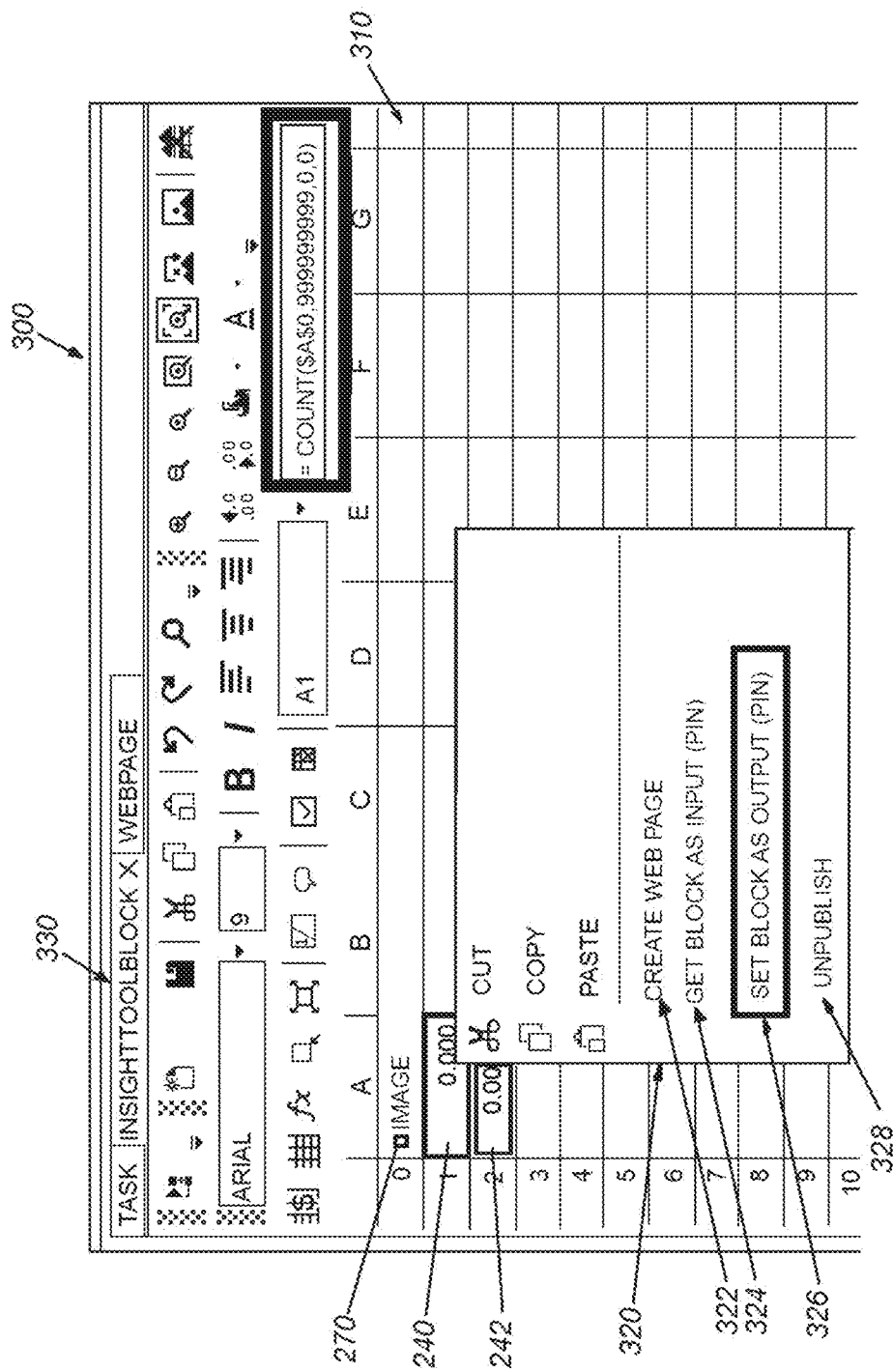
FIG. 3 is a diagram showing an exemplary GUI screen on a user interface device with a portion of the spreadsheet in which a dropdown context menu allows cells from FIG. 2 to be marked as an output pin.
Figure 4:
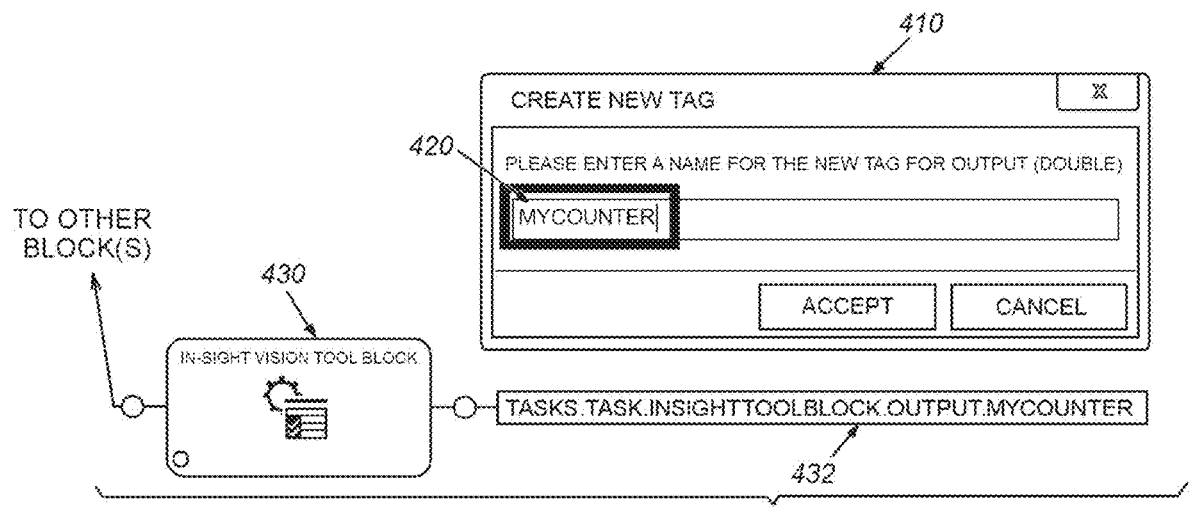
FIG. 4 is a diagram showing an exemplary GUI screen on a user interface device with a dialog box in which a new tag for the vision system camera assigned to the output pin of FIG. 3.
Figure 5:
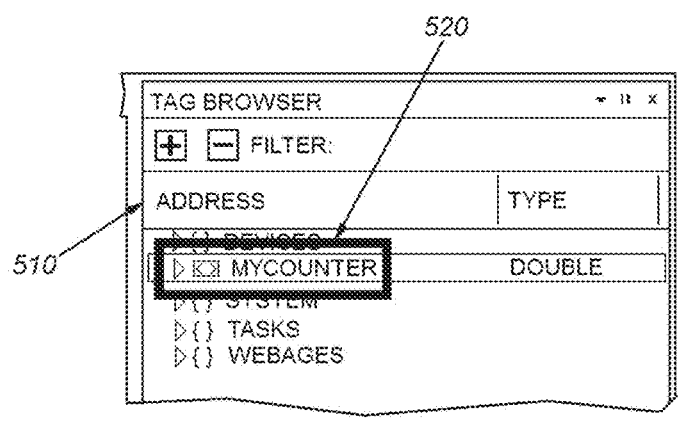
FIG. 5 is a diagram showing an exemplary GUI screen on a user interface device with a menu in which the newly created tag of FIG. 4 moved into the menu.

In exemplary user-device-based screen 300 of FIG. 3, the spreadsheet 310 includes the cells 240 and 242 (in FIG. 2 above) in association with Image 270. The cells list zero values. A dropdown context menu 320, includes a set of commands, including "Create a WebPage" 322 (i.e. create an HMI), "Get as Block Input (i.e. create an input pin)" 324, "Set Block as Output (i.e. create an output pin)" 326, and "Unpublish" 328, all in connection with the vision system "ToolBlock" tab 330 of the spreadsheet 310. In this example, the Publish to Output Pin command is selected so that the highlighted cell 240 is marked as such. Hence, the cell's output attribute is set to a "True" value.

Figure 6:
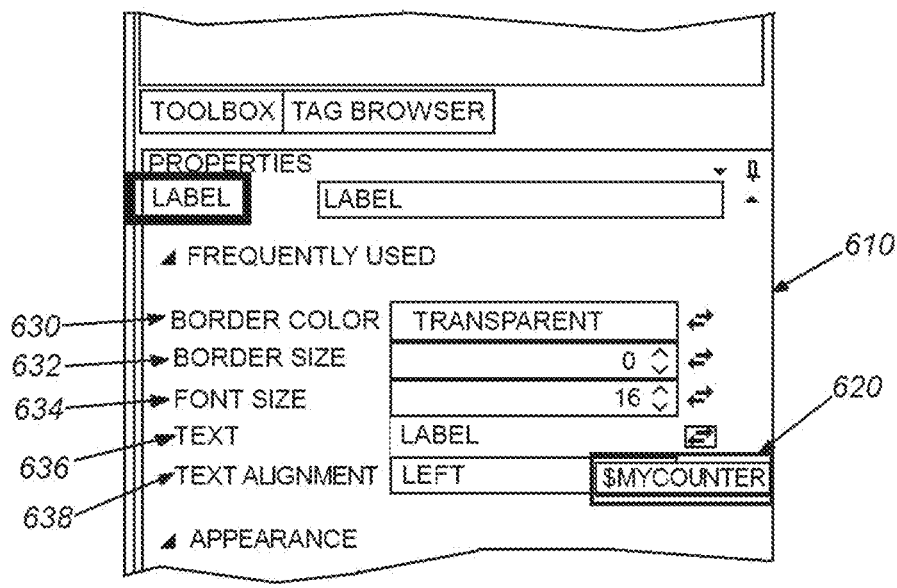
FIG. 6 is a diagram showing an exemplary GUI screen on a user interface device with a menu in which a new label is added to the user web page and bound to the tag of FIG. 5.
Figure 7:
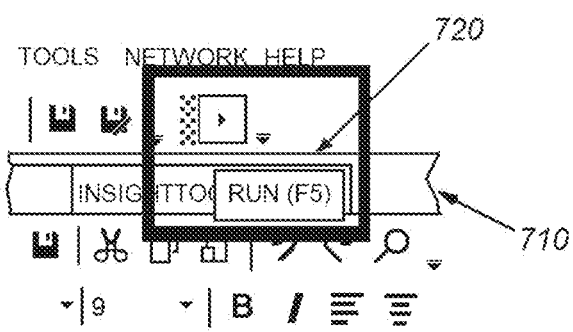
FIG. 7 is a diagram showing an exemplary GUI screen on a user interface device with a menu in which a user runs the project (in FIGS. 2-6) deployed to the vision system.
Figure 8:
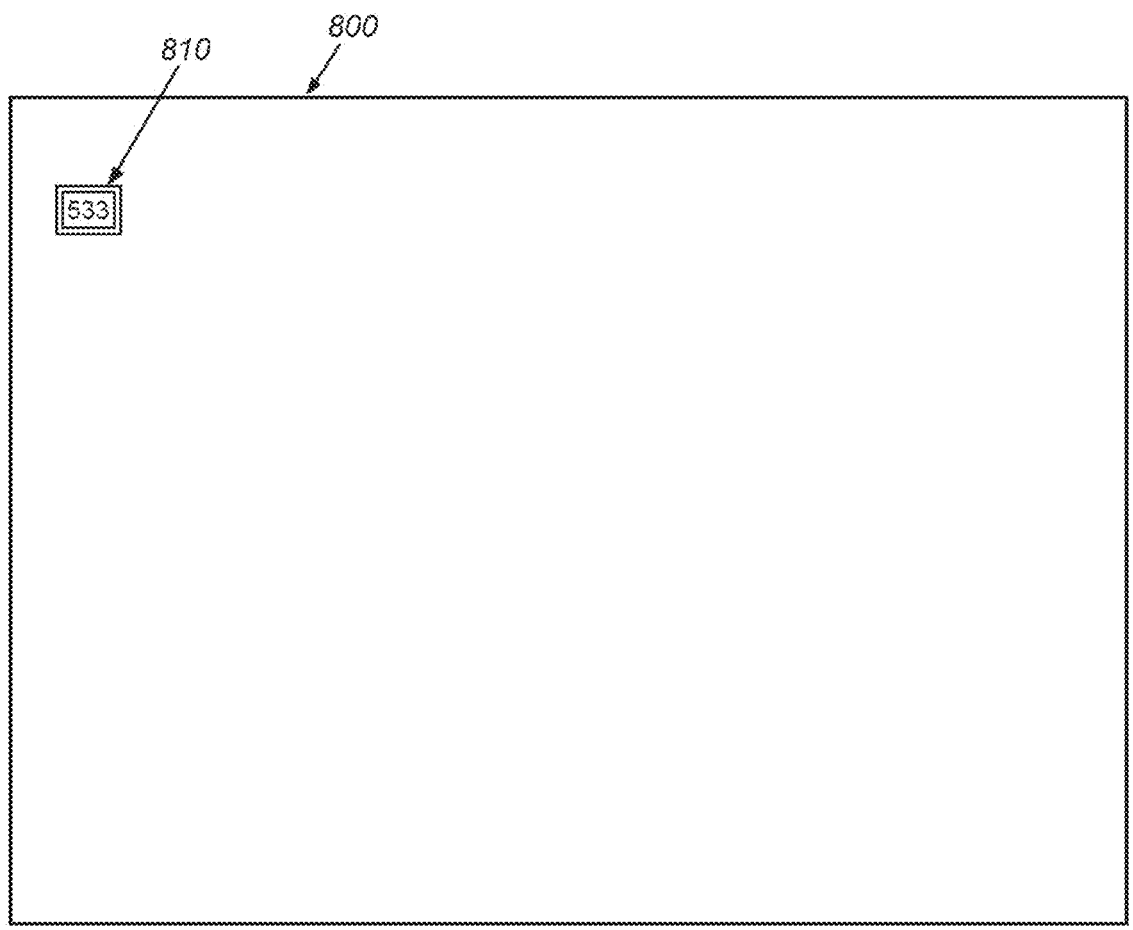
FIG. 8 is a diagram showing an exemplary GUI screen on a user interface device in which the label has been updated based upon the run command in FIG. 7.

The system allows input pins and output pins to be created, which respectively define the functions or parameters that are input by a user or external source to the vision system through the HMI and those that are output from the vision system to the user via the HMI. These are linked to a tool block using a "tag", which is a discrete name for that input or output that allow it to be identified within the tool block. A dialog box 410 is presented in FIG. 4 as a result of the publish command. The dialog box 410 allows the user to enter a new tag name (e.g. "MyCounter") 420 in the space provided. This tag 420 is assigned to the new output pin. A tool block symbol 430 is displayed and after the tag is accepted, it will appear as shown (432) appended to the tool block 430. Then, in FIG. 5, the new tag 520 is added to the root (by default) in the tag browser 510. In FIG. 6, the new tag is bound to a label control 620. The label control specifies various HMI characteristics, including the box border type (e.g. transparent) 630, the border size 632, font size 634, text 636 and text alignment (e.g. left) 638. After the tag is bound to the label control, then the update project is deployed to the system processor and run via the run tab 720 at the top 710 of the spreadsheet (FIG. 7). As shown in the screen 800 of FIG. 8, the HMI label control 810 is updated as the related cell in the spreadsheet is changed based upon the above process.

To complete the process of setting up an HMI and associated HMI elements, a similar set of steps is then performed to inform the camera spreadsheet that the control's value has changed (for example cell 242 is FIG. 2). In this case, an input pin is created with an appropriate tag and binding of the tag to a numeric entry control on the HMI. Similarly, image presentation can be updated via appropriate settings and cells within the spreadsheet using the general steps described above, including the creation of tags. The above-described spreadsheet procedure should be understood by those of skill, with reference, by way of non-limiting example, to the InSight® system available from Cognex Corporation of Natick, Mass.

It should be clear that the above-described process requires a significant number of steps and proficiency to achieve a desired HMI presentation. This approach is, thus, time-consuming and labor-intensive.

III. Automated HMI Generation

Figure 9:
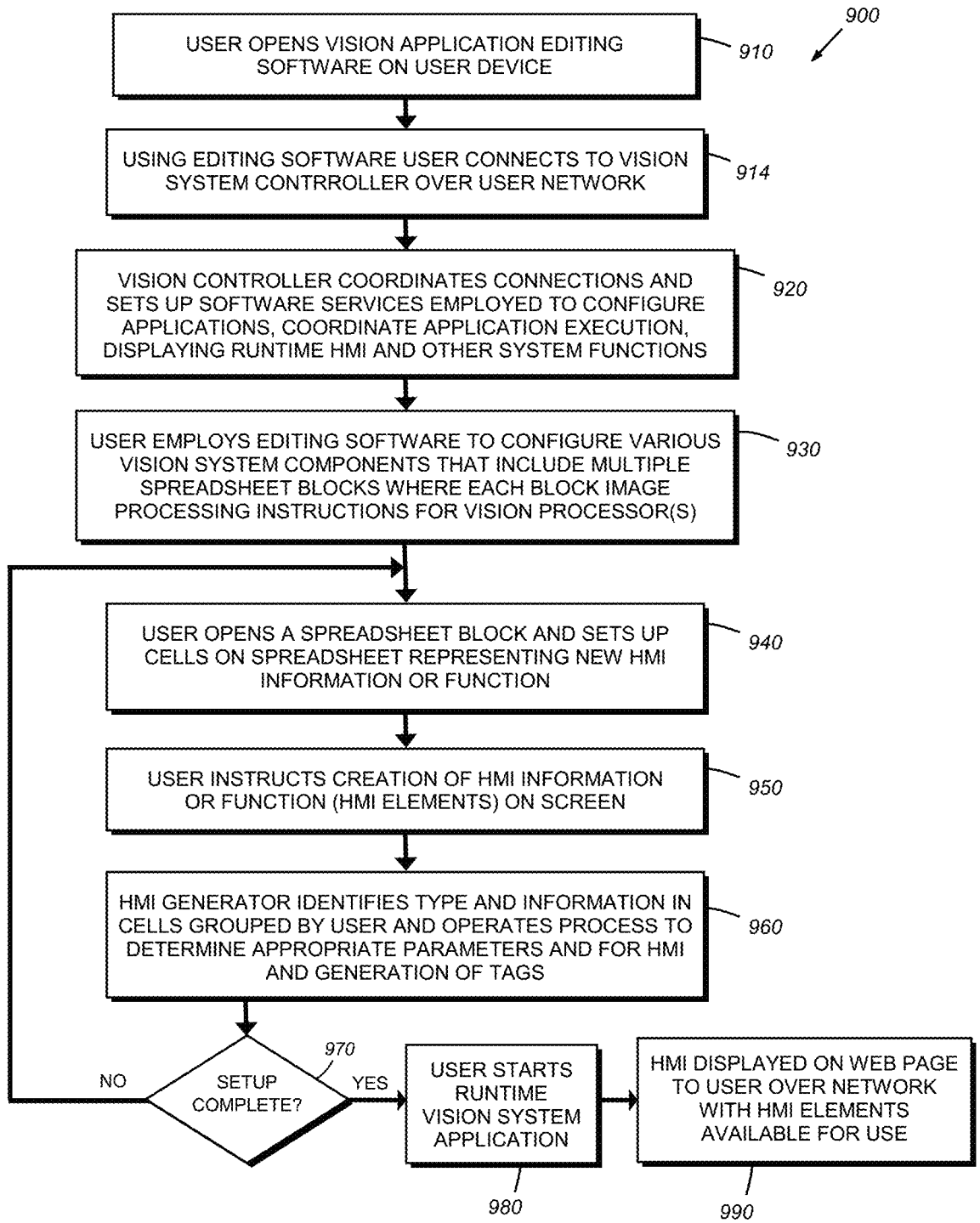
FIG. 9 is a flow diagram of an overall process for automatically generating an HMI based on user-input spreadsheet data for use in the arrangement of FIG. 1, according to an exemplary embodiment.

With reference now to FIG. 9, an overall process 900 for automatically generating an HMI is shown and described. As provided above, the user device (PC, laptop, smartphone, tablet, server, etc.) contains a graphical user interface display (keyboard, mouse, touchscreen, etc.) that allows interaction with data and applications. Those applications include a web browser of appropriate type that allows web-based protocols and languages, such as HTML, to be employed. The user, via his/her device opens the vision system's editing software application, which displays various functions and options in its GUI in step 910. Using the editing software application, the user then connects to the vision system controller 130 and associated HMI server 134 in step 914. This can be accomplished on the user (factory) network using an appropriate IP address or other identifier (internal website).

In step 920, the vision system controller's (130 in FIG. 1) runtime software coordinates connections and sets up the appropriate software services required for configuring applications, coordinating application execution, displaying runtime HMI, and other functions. The editing software on the user device connects to several of these services to allow user to edit, and interactively run and test the HMI elements he or she creates. Note that the editing application software (including the spreadsheet) is typically resident on the user device, but in alternative arrangements it can be provided (e.g. in web page/HTML form to the user device via a remote server, including, but not limited to a cloud-based application, an application residing on the vision system controller 130 or a processor associated with one or more of the cameras. This spreadsheet is linked to the interface process(or) 136 and HMI generation process(or) 138 of the vision system controller 130.

According to step 930, in the editing environment provided by the software application and associated spreadsheet, the user configures various components of the vision application that include multiple spreadsheet blocks. Each spreadsheet block contains image processing instructions for cameras (e.g. cameras 110, 112, 114 and 116 in FIG. 1). In step 940, the user opens a spreadsheet block and sets up and/or highlights one or more cells in the spreadsheet representing a new or updated HMI element (i.e. information, function, etc.). The term "HMI element" as used herein includes any label, control, image display window, or other graphical display item appearing within the HMI screen that is used to control operation of the camera or vision system, or any item that appears within the HMI screen to relay data to a user about the operation of the camera or vision system, or the imaged scene. As the HMI server 134 of the vision system controller 130 interconnects one or more vision system cameras (e.g. cameras 110, 112, 114 and 116 in FIG. 1), the HMI elements can be associated with a particular camera or a group of cameras.

Figure 10:
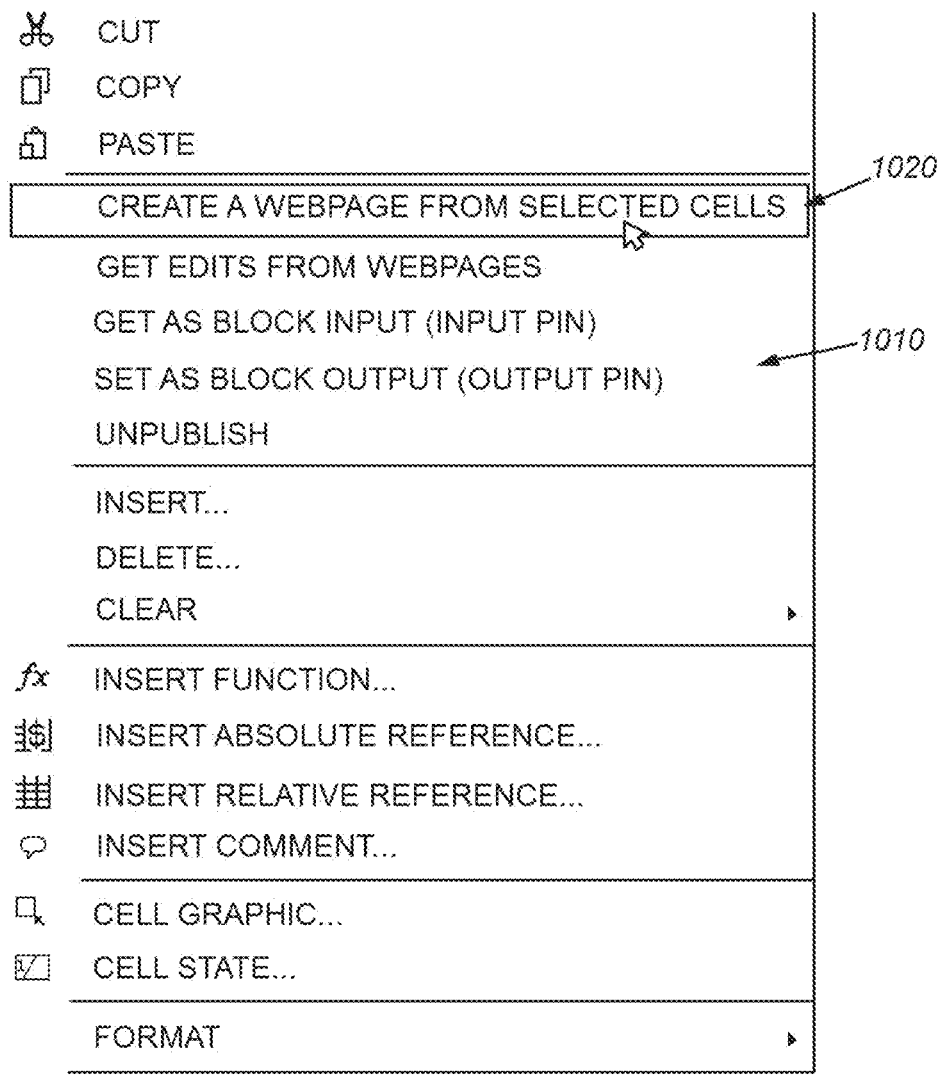
FIG. 10 is a diagram showing an exemplary GUI screen on a user interface device with an exemplary dropdown context menu allows a group of cells to be used to generate an HMI (web page) according to the exemplary embodiment.
Figure 10A:
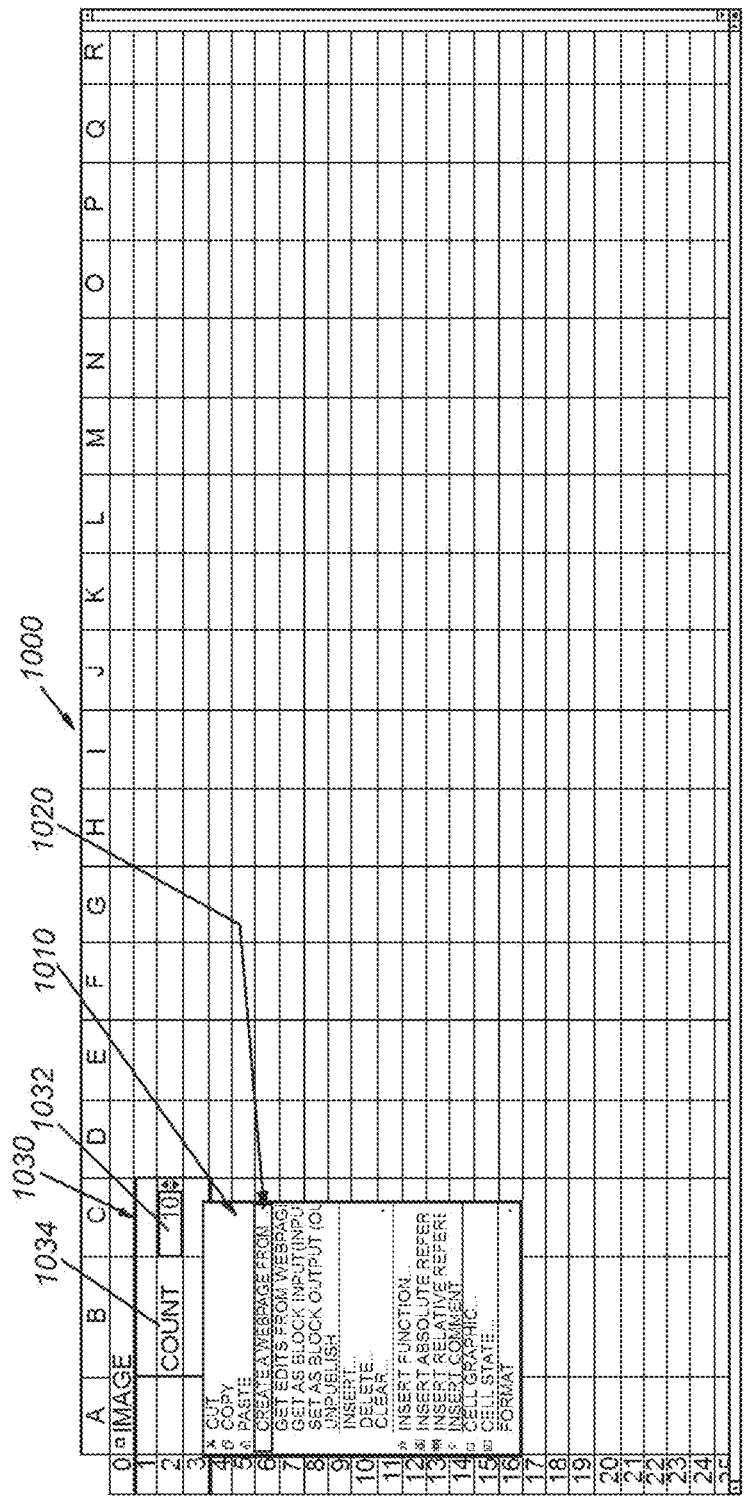
FIG. 10A is a diagram showing an exemplary GUI screen on a user interface with a spreadsheet having a grouping of cells to generate HMI elements and the dropdown context menu of FIG. 10 used to automatically generate an HMI screen based upon the grouping.

Having set up and grouped cells in the spreadsheet, the user then instructs creation of the associated HMI information and/or function on the HMI screen (web page) in step 950. With reference to FIGS. 10 and 10A, the dropdown (context) menu 1010 (shown separately in FIG. 10 and with an exemplary spreadsheet 100 in FIG. 10A), contains a new command entitled "Create a WebPage from Selected Cells" 1020, in addition to the Publish commands described with respect to the context menu (320 in FIG. 3) described above. This command is associated with the cell group entitled "Count" 1030 with a spinner in right hand cell 1032 beside a label "Count" in the left hand cell 1034. This spinner function and GUI element is then automatically placed in the HMI screen with the appropriate location and scaling based upon the automated process. In step 960, the HMI generator 176 on the user device identifies the type of information presented in the grouping of highlighted cells, and determines the appropriate parameters and/or settings to associate with these cells for the HMI screen. In particular, the location(s) and dimensions of HMI controls can be characterized by these parameters/settings. Additional metadata is also automatically generated as described below. This information is provided to the tag manager 138 on the vision system controller 130.

As denoted by the decision step 970, the steps 940-960 can be repeated by the user for the same spreadsheet block with a different range (grouping) of cells. Alternatively, the user can repeat these steps for a different spreadsheet block. When the user's setup (training) is complete (decision step 970), the user can initiate a (e.g.) runtime vision system process using the camera(s) to acquire images of the scene in step 980. The HMI screen is updated, and appropriate information is communicated to the processor of each affected camera over the camera network (125 in FIG. 1) via the project file and spreadsheet. The resulting HMI is then displayed on the user device via a web page that is configured using spreadsheet data from the camera relayed through the vision system controller 130. In particular, the graphical elements on the HMI are live and allow display of information from the camera(s) and control of the camera(s) (step 990).

The automated process also transfers metadata from the spreadsheet cells to the HMI. For example, the minimum and maximum limits of a spinner cell are set in the corresponding HMI spinner via the metadata. Similarly, the string entries of a list box cell are recreated in the HMI list box via such metadata. In a manual version according to a prior implementation, the user is tasked with the set up of such metadata in association with HMI controls. Hence, the automated approach allows for the omission of such a time-consuming task. The automation of metadata can be based upon an algorithm and/or look up table that defines accepted information to be included for a control, label, screen, etc. of a particular type.

Figure 10B:
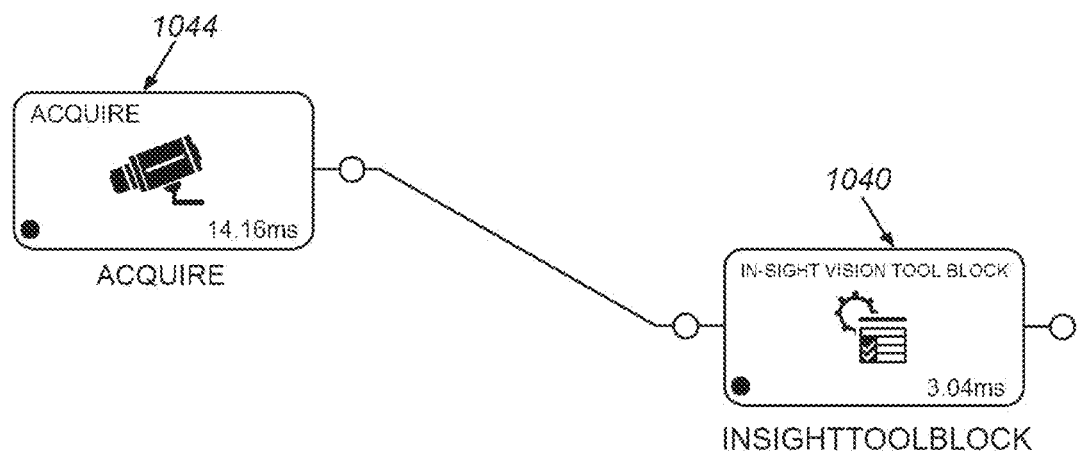
FIG. 10B is a diagram of a vision system tool block before generation of an HMI using the spreadsheet of FIG. 10A.
Figure 10C:
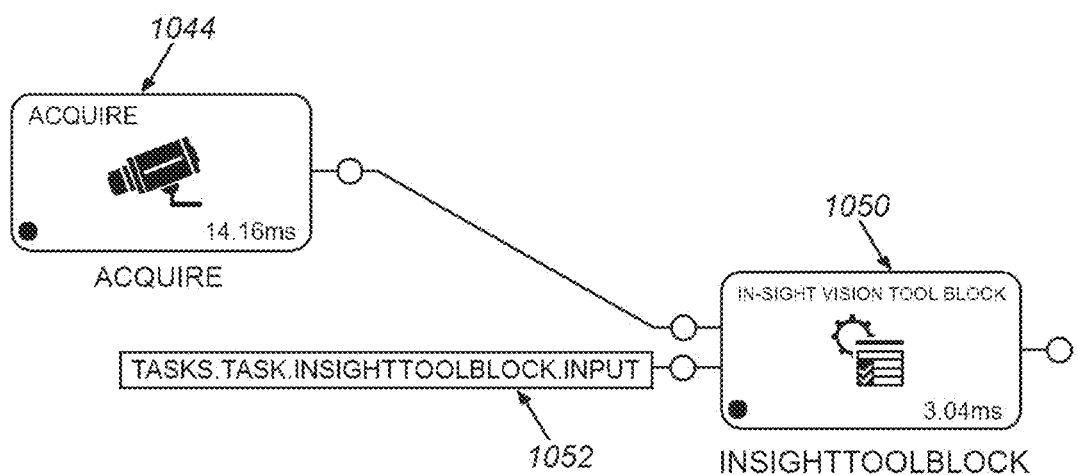
FIG. 10C is a diagram of a vision system tool block after generation of an HMI using the spreadsheet of FIG. 10C.
Figure 10D:
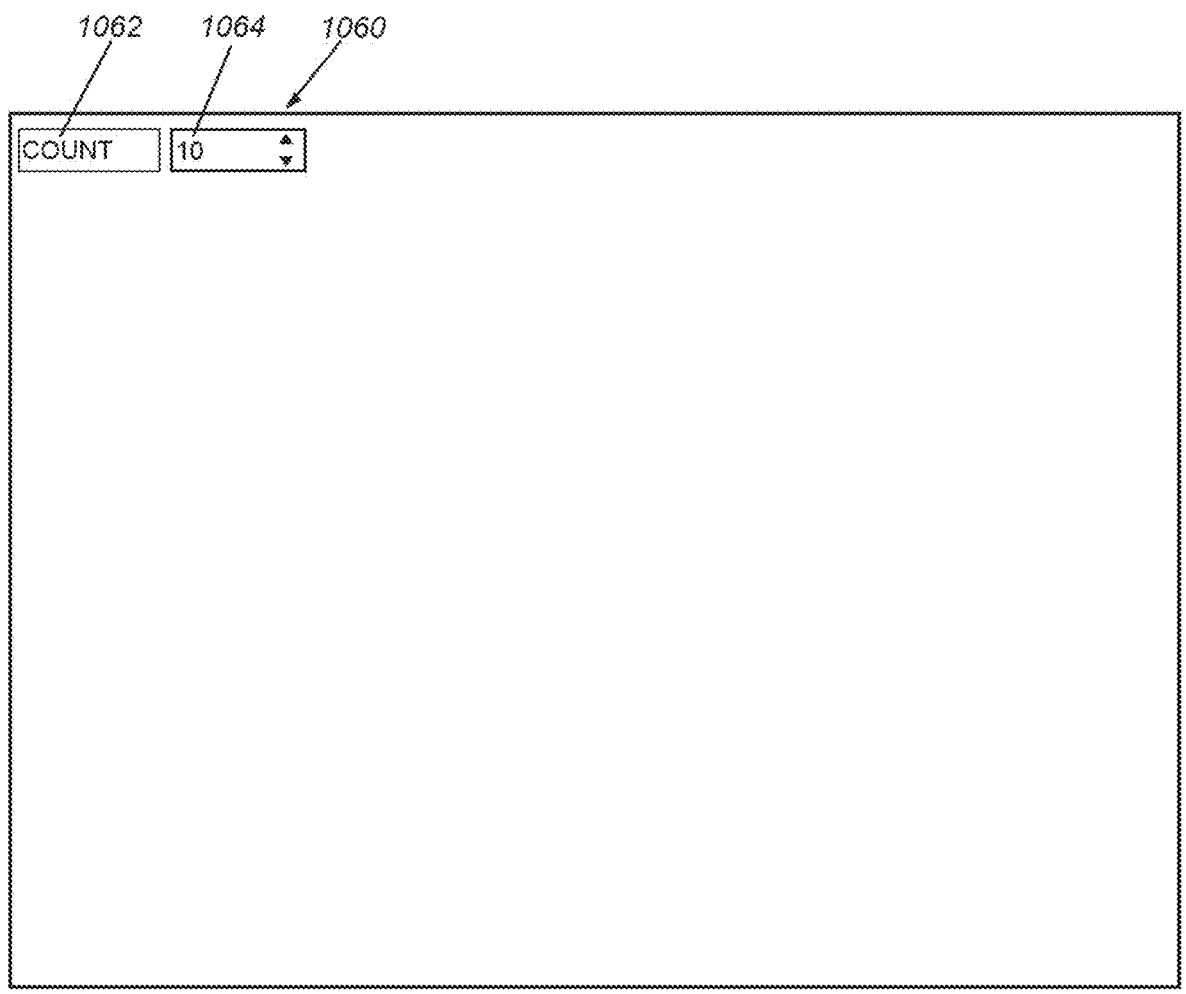
FIG. 10D is a diagram of an exemplary GUI screen on a user interface showing the resulting HMI elements generated according to FIG. 10A.

With reference to FIGS. 10B and 10C, the tool block (shown in a ladder logic form) is automatically updated by the process from a first configuration 1040 (in FIG. 10B), where no task is associates with the acquisition of images 1044, to a second configuration where acquisition 1044 is associated with a tool block configuration 1050 and task 1052 (represented by the "Count" cells 1032 and 1034). The tags for this task are generated by the HMI generator and handled between the user device and the camera by the tag manager. The resulting, exemplary HMI screen 1060 is shown in FIG. 10D. Based on the create command 1020 in FIG. 10A, the label "Count" 1062 and associated numerical readout 1064 are presented in the same order as the cells of the spreadsheet 1000 in the upper left hand corner in a readable size/scale. The placement of the elements is variable based on defaults and/or user preferences. In general, the placement in this example follows the position within the cell grouping, with top left in the grouping corresponding to top left in the HMI screen.

More particularly, the HMI generator 176 operates various procedures that essentially automate the steps described in FIGS. 2-8 above. These steps are automated based upon known characteristics contained in certain types of screen elements and standardized settings. For example, if a label is called for it is presented in a certain location, scale and size. The location scale and size can vary where there are multiple labels. Likewise, an image window is presented in a certain size and location, and where multiple windows are called for, the size and location(s) vary accordingly. This can be accomplished using appropriate algorithms that employ formulas with constants (e.g. a scaling function) and/or using look-up tables with a range of values that are applied to elements in the screen.

The HMI is typically generated in a pre-runtime or "training" stage of the overall operation of the vision system. Once generated, the tags and other data are stored in the project file. This information is continuously read by the camera processor via its spreadsheet in runtime, and information is passed through the network(s) between the camera and the user device, with the vision system controller handling the communication path and protocols. The user device interprets received information into the generated HMI form for the user, while the camera processor sees the same information in spreadsheet form.

Figure 11:
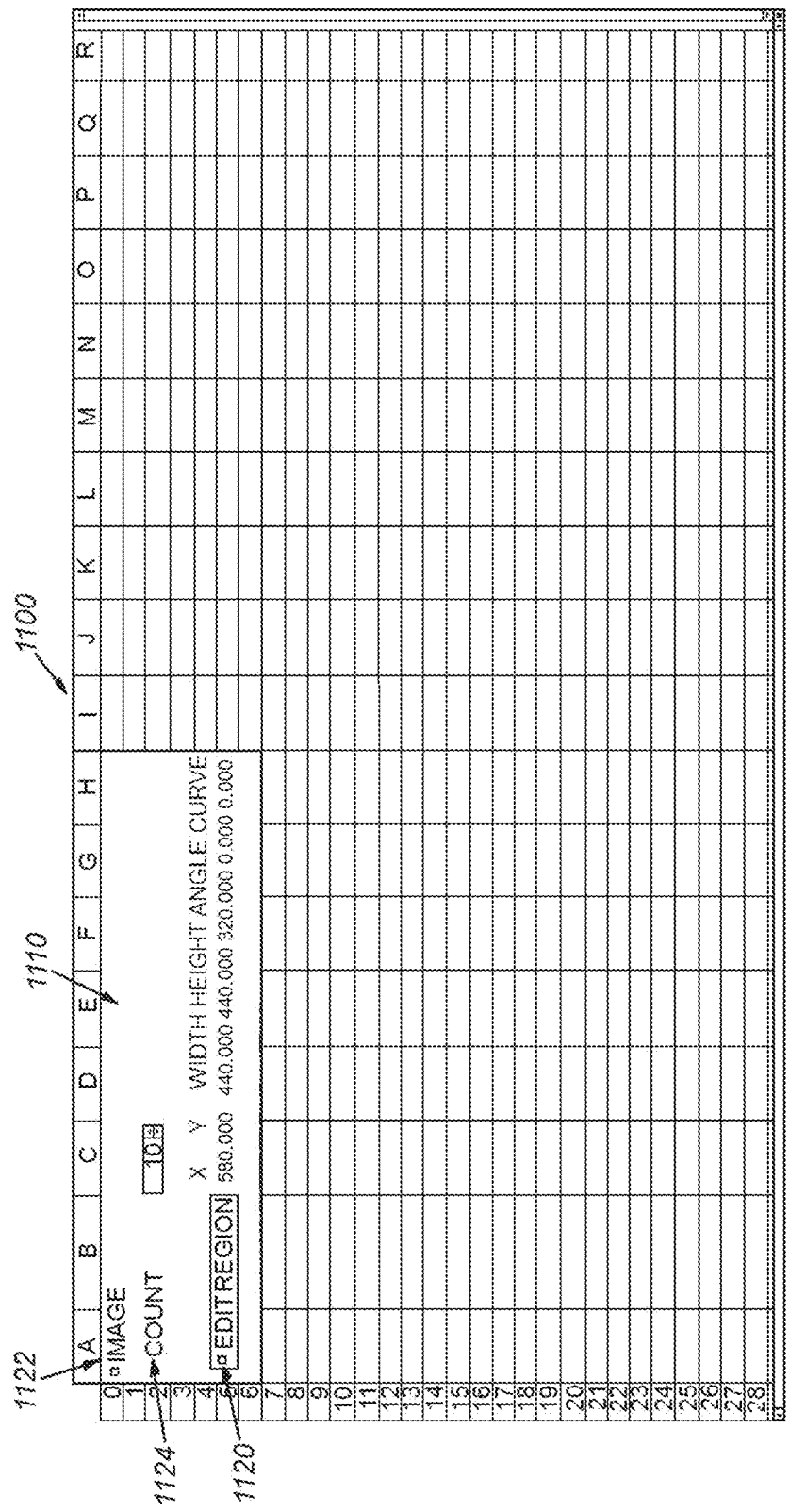
FIG. 11 is a diagram showing an exemplary GUI screen on a user interface with a spreadsheet having a grouping of cells to generate HMI elements.
Figure 12:
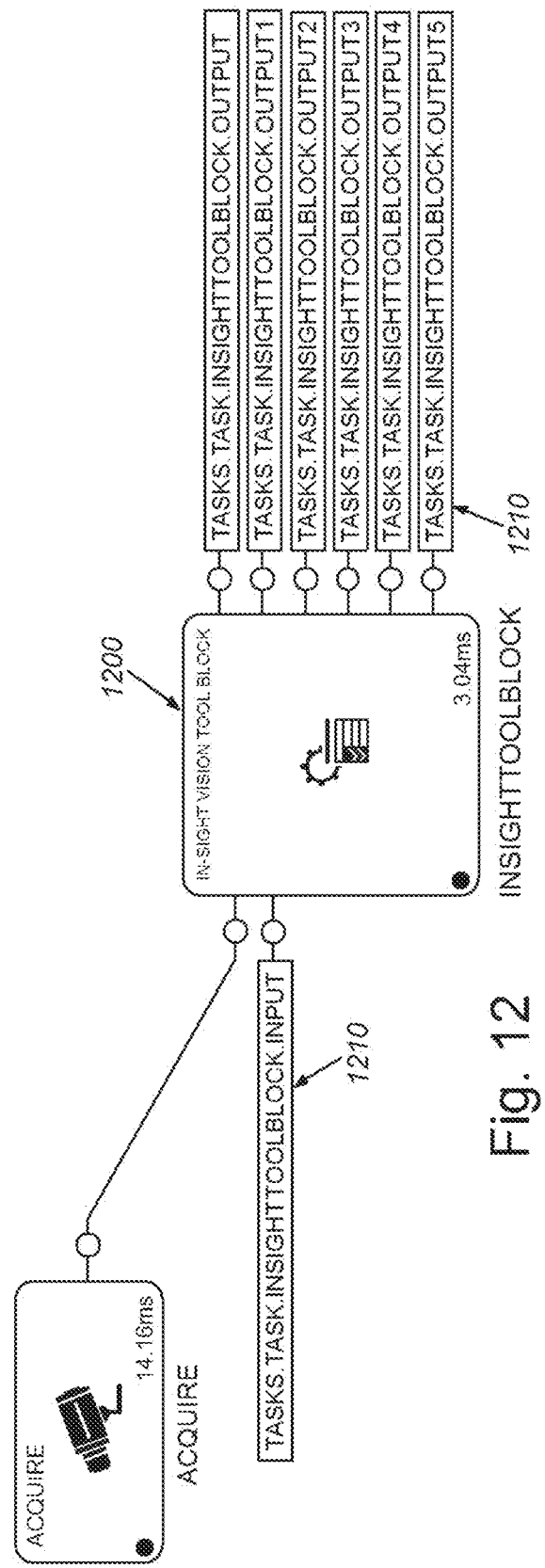
FIG. 12 is a diagram showing an exemplary vision system tool block with tasks generated automatically with respect to the spreadsheet of FIG. 11 appended thereto.
Figure 13:
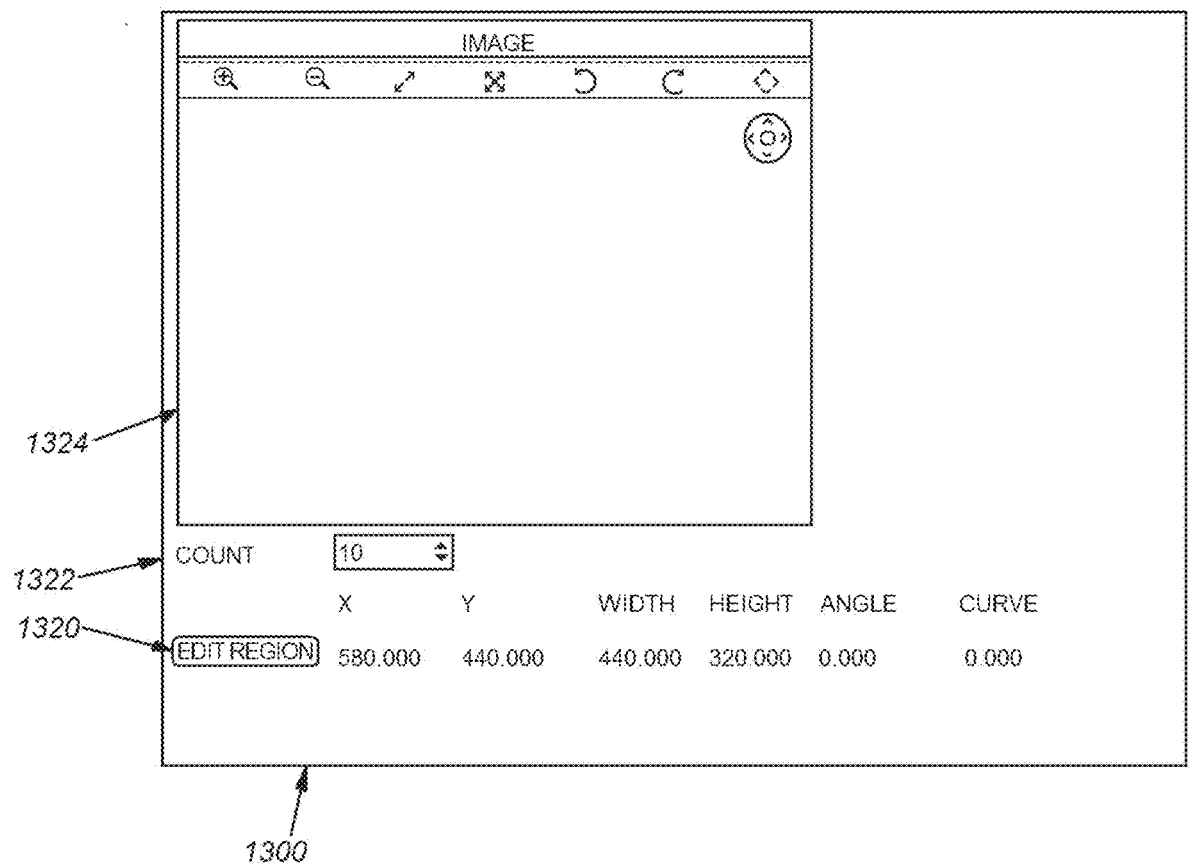
FIG. 13 is a diagram of an exemplary GUI screen on a user interface showing the resulting HMI elements generated according to FIGS. 11 and 12, in a pre-runtime state.
Figure 14:
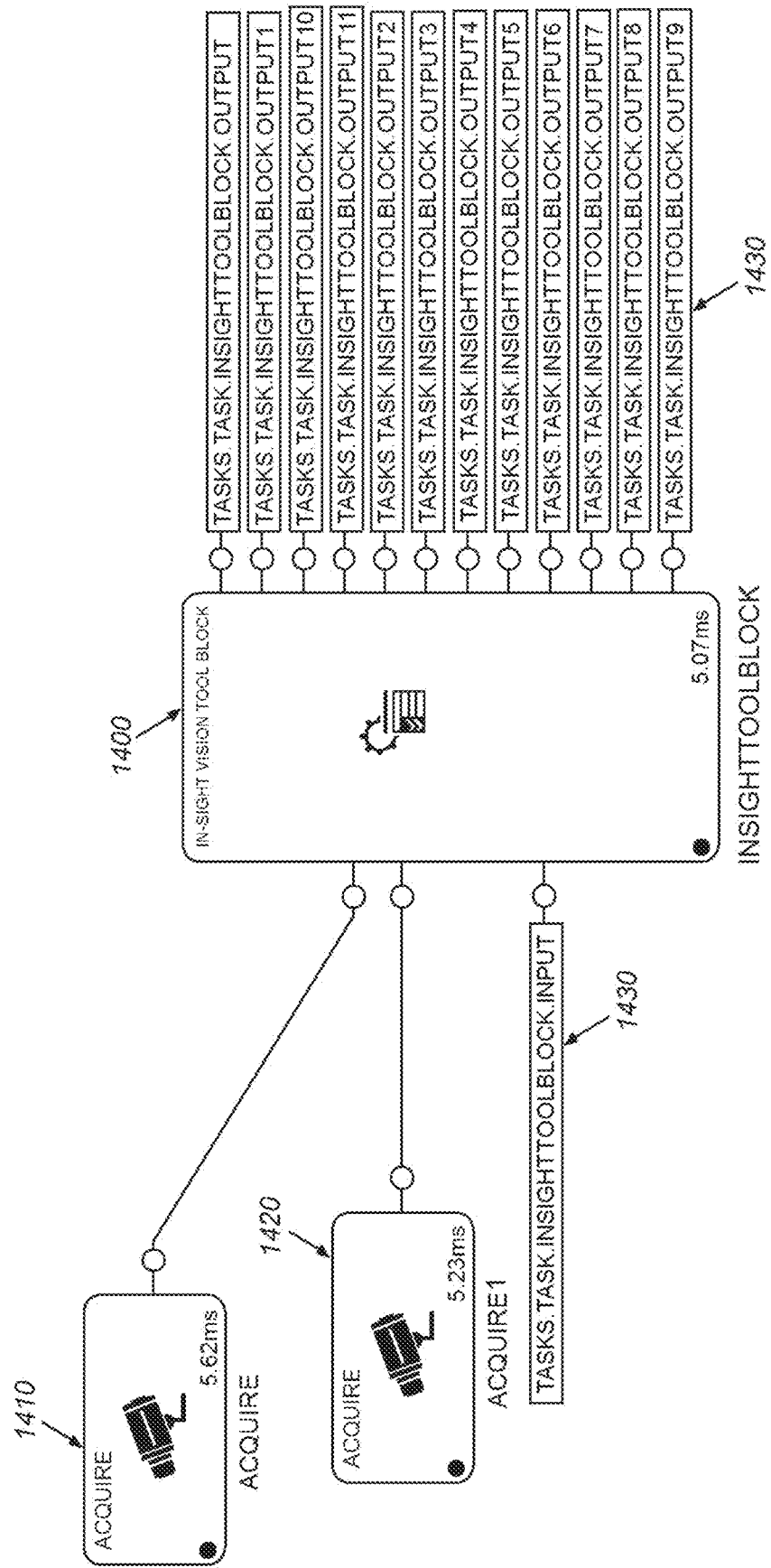
FIG. 14 is a diagram showing an exemplary vision system tool block with tasks generated automatically involving a plurality of interconnected vision system cameras.

The automated processes herein can be employed to generate a variety of HMI arrangements. In FIG. 11, an exemplary spreadsheet 1100 is arranged with a grouping 1110 of cells that includes a bottom row 1120 specifying a region and associated values. Labels appear above the elements in the row. A middle row 1124 has a counter label and function and an image display window 1120 is specified in the top left. In FIG. 12, the HMI generation command (not shown) automatically creates a series of tasks 1210 that are appended to the tool block 1200 for use by the camera processor. The resulting HMI screen 1300 is shown in FIG. 13. In general it includes a resulting region row 1320, counter row 1322, and image display window 1324. Notably, the HMI elements are positioned in accordance with their layout in the cells in the spreadsheet 1100 and sized/scaled to fill the screen and provide a well-organized and readable display.

Figure 15:
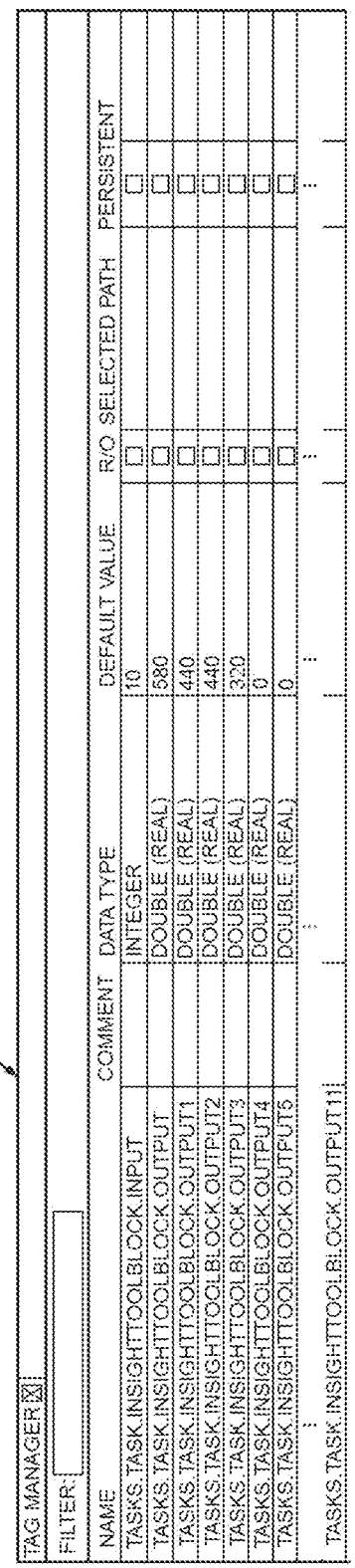
FIG. 15 is a diagram of an exemplary list of tasks/tags associated with a tag manager in a vision system controller according to an embodiment.
Figure 16:
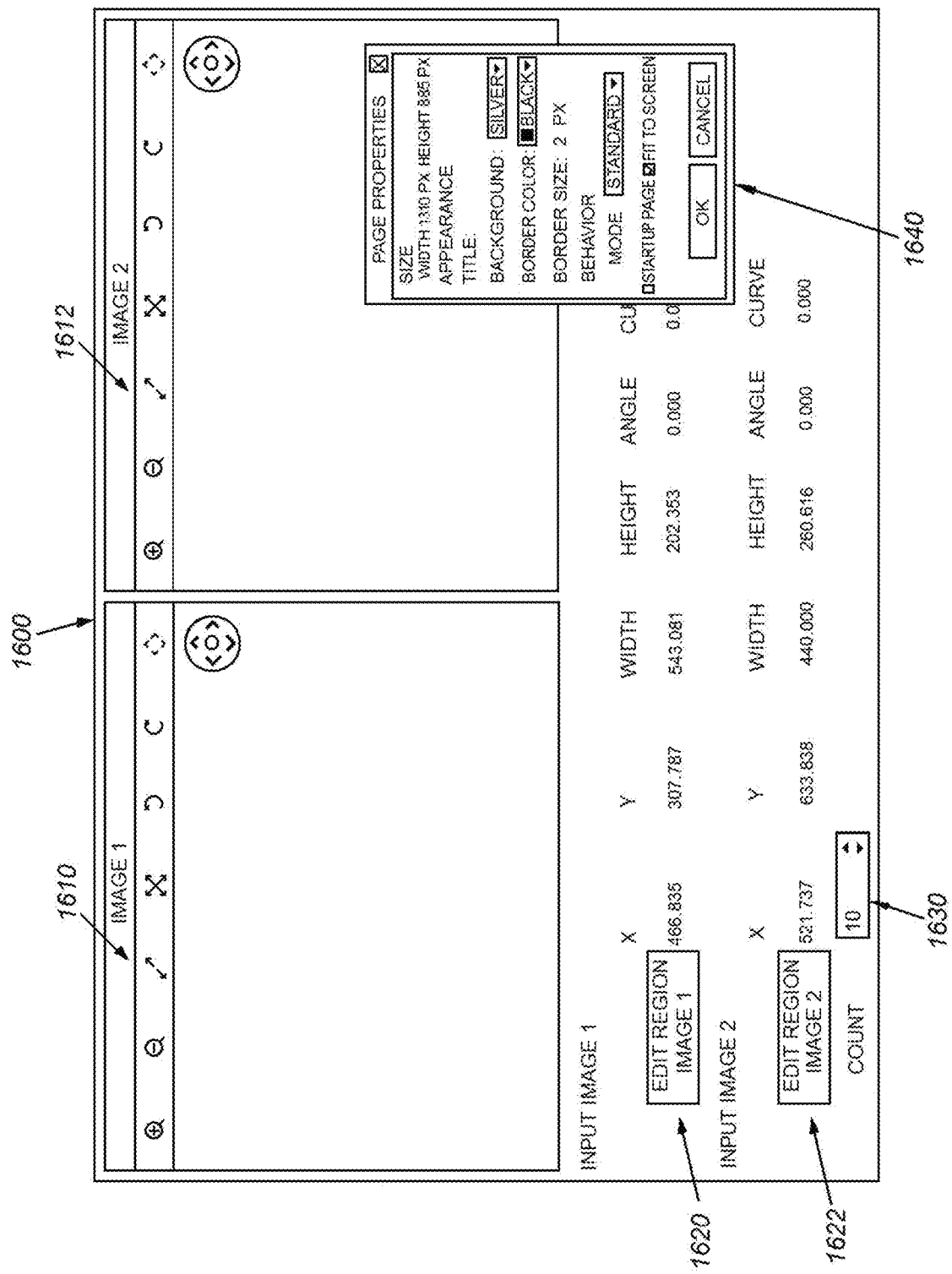
FIG. 16 is a diagram of an exemplary GUI screen on a user interface showing the resulting HMI elements generated according to FIGS. 14 and 15 in a pre-runtime state, and including a dropdown menu for configuration of screen properties.
Figure 17:
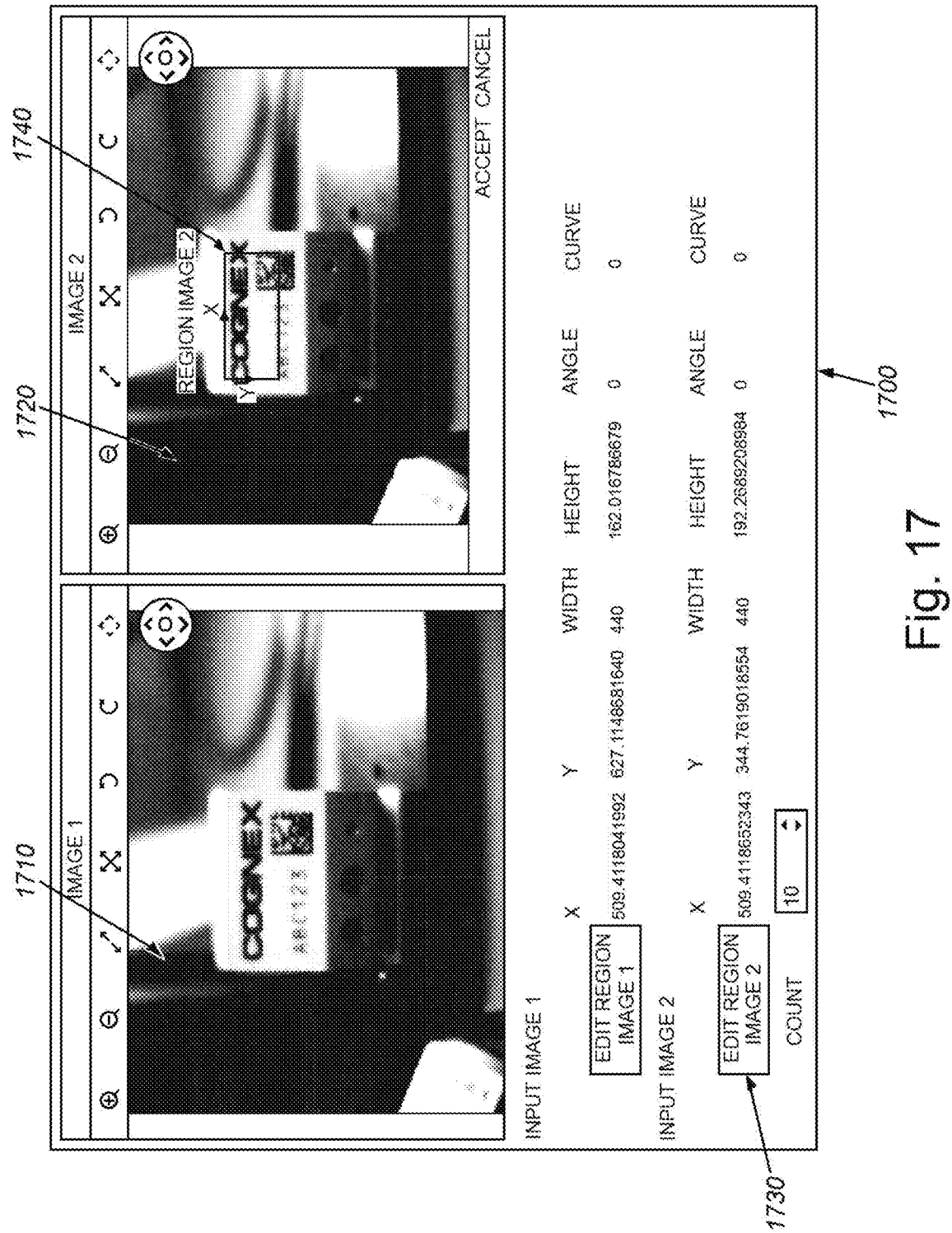
FIG. 17 is a diagram of an exemplary GUI screen on a user interface showing the display of exemplary images and region controls in a runtime version of the HMI screen of FIG. 16.

In the example of FIGS. 14-17, a relatively involved HMI can be created. The spreadsheet (not shown) has been automatically converted to tasks and tags, and the vision system tool block 1400 is shown operating the tasks 1430 in association with two separate cameras 1410 and 1420. The tag manager (typically running in the vision system controller) includes the list of tasks 1500 as shown in FIG. 15 (note that the list is shown in partial for brevity, covering from exemplary tag entries Tasks.Task.InSightToolBlock.Output1 through Tasks.Task.InSightToolBlock.Output11 (ap-pended to ToolBlock 1400 (FIG. 14)). The resulting HMI screen 1600 is shown in a pre-runtime phase in FIG. 16. Notably, the screen 1600 includes display windows 1610 and 1612 for each of the cameras, and associated region controls in rows 1620 and 1622. A count element 1630 is also provided at the bottom of the screen 1600. The HMI shows a dropdown menu box 1640, which allows various screen (web page) properties to be adjusted. For example, the user can provide differing background colors/patterns for each display window 1610, 1612. The user can also vary certain dimensions (e.g. width and height). These properties can also be set by default by the HMI generator. It should be clear that a variety of appearance and presentation parameters can be adjusted during pre-runtime and runtime as appropriate. These settings can be updated/stored in the project file. As shown in FIG. 17, the runtime version 1700 of the screen 1600 (FIG. 16) displays separate runtime images (frames) 1710 and 1720 acquired by each camera, respectively. By way of example, the region control 1730 for the right hand image 1712 specifies a corresponding region of interest 1740 (in terms of width X and height Y) within the overall image for operation of vision system tools, etc.

As described above, the arrangement of the displayed images and data/controls is sized and laid out appropriately to create a desirable user experience. The parameters that generate such a layout and scale are automatically determined by the process based on the number of elements, their function and a size that is desired for user-friendly interaction. That is, the process places images side by side or in an interrelated block (e.g. a square of four images). The process places user-defined labels (e.g. Image1, Image2, etc.) in a convenient location adjacent each image (e.g. on top) and places data/control elements (e.g. numerical inputs and outputs) at a desired spacing and location (e.g. below), and arranges the data/control so that they are clearly associated with each image (e.g. in a respective row). Labels are placed above data elements in this arrangement. The layout efficiently uses the available space and scales alphanumeric elements so that they are readable given the size of the screen. Note that such scaling functions can be adapted from available web design tools that allow pages to adapt to differing size user device display screens.

Figure 18:
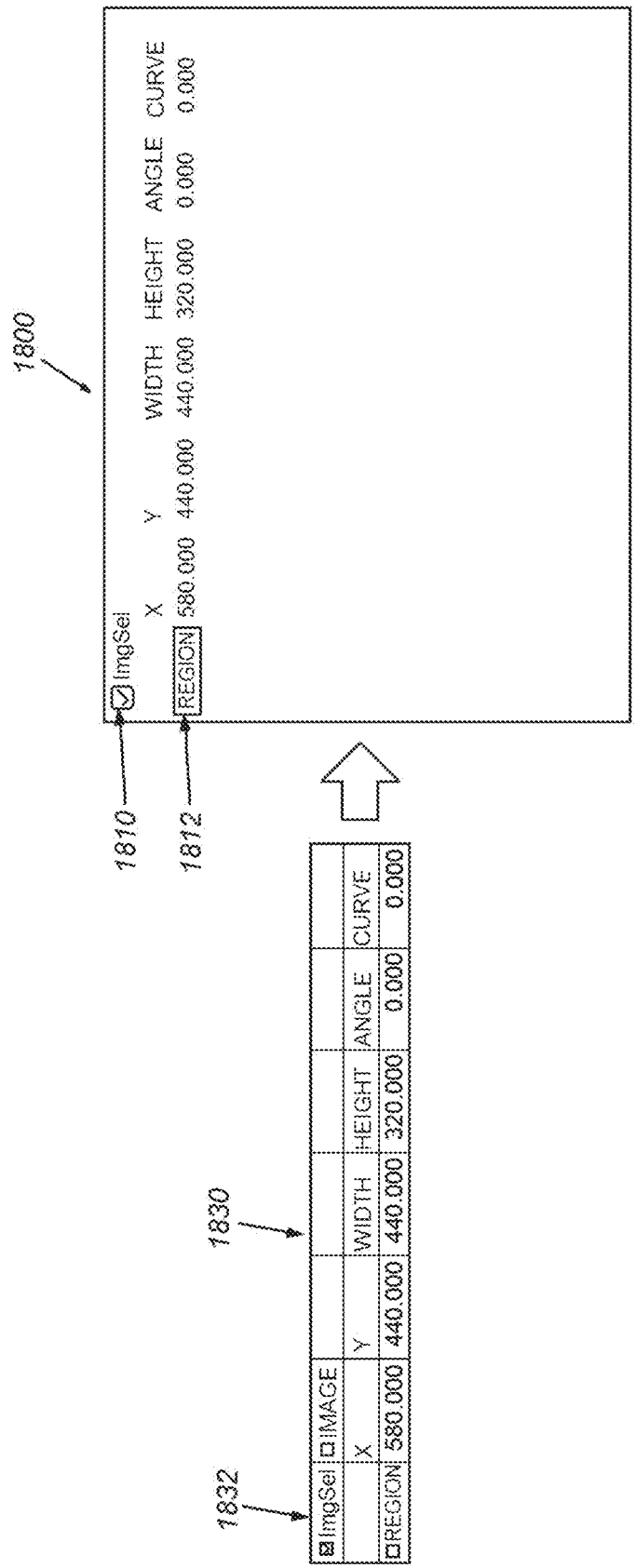
FIG. 18 is a diagram showing an exemplary GUI screen on a user interface with a grouping of spreadsheet cells and the resulting automatically generated HMI, including an exemplary checkbox function.

In general, the types of HMI elements used are highly variable. FIG. 18, the exemplary HMI screen 1800 includes a checkbox function 1810 and associated result data 1812 in a row below the checkbox 1810. These correspond to the user's setup in the cell grouping 1830, including a cell 1832 specifying a checkbox.

While not shown, it is contemplated that additional data elements sourced from external devices (e.g. encoders, robot manipulators, range finders, motion stages) can be linked via the spreadsheet and incorporated into the HMI in a manner described above.

IV. Conclusion

It should be clear that the above-described system and method for automatically generating HMI screens for use in monitoring and controlling vision systems comprised on one or more cameras affords the user a significantly easier to use setup experience. It also uses automated scaling and positioning of elements within the HMI screen to generally optimize the available screen space, provide a pleasing and user-friendly layout and ensure readability of data. More generally, the system and method provides a spreadsheet having a standard cell region including a plurality of standard cells displayable and accessible as standard spreadsheet cells. The user interface elements (controls) can be interacted with. This interaction can result in (among other items), (a) data changes in a running (i.e. vision system) software application, (b) invocation of other methods that the software application provides; (c) data screens—showing data updating as the software application executes, including displays of images and graphics. The spreadsheet can contain multiple element types such as images, simple data values, and control constructs, including, but not limited to, buttons, spinners, and checkboxes. Notably, the automatically generated user interface runs in a common web browser available on a variety of user devices including PCs, laptops, tablets, smartphones, servers, etc. The communication protocol to and from the vision system can be automatically determined by (e.g.) the interconnected HMI server process(or)—for example TCI/IP. Additionally, data from the vision system is automatically sent from to user interface running in the web browser. Likewise, user input to the web browser user interface can send data back to the vision system. Advantageously, camera images from the vision system are automatically displayed and scaled to fit inside a screen control on the user interface, generally regardless of display screen size, allowing cross compatibility across a wide range of user devices as described above. Results of the vision system from vision tools are graphically drawn in the screen control on the user interface, and sized/arranged in a manner that provides a desirable user experience.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system for use in automatically generating a human-machine interface (HMI) in a vision system having one or more cameras, comprising:
    an HMI generator configured to automatically generate the HMI, the HMI generator being responsive to a spreadsheet such that, after generation of the HMI, data changes in the spreadsheet are automatically propagated to the HMI, the spreadsheet having a standard cell region with a plurality of standard cells displayable and accessible as standard spreadsheet cells, the cells each corresponding to an HMI element,
    wherein the HMI is displayed in a web browser of a user device and the HMI includes at least one graphical element configured to allow a user to control a camera and to display live information, comprising at least one runtime image, from the camera.

2. A spreadsheet for use in the system of claim 1.

3. The system as set forth in claim 1 further comprising vision system controller that is interconnected over a first network between a processor of the one or more cameras that operate based upon the spreadsheet, and the vision system controller being linked to one or more user devices that display the HMI to a user.

4. The system as set forth in claim 3 wherein the user devices are linked to the vision system controller via a second network.

5. The system as set forth in claim 4 wherein the first network comprises a local camera network and the second network comprises a separate, user-related network.

6. The system as set forth in claim 4 wherein the vision system controller selects an appropriate communication protocol to communicate with the processor of the one or more cameras.

7. The system as set forth in claim 1 wherein the HMI includes user interface elements that enable at least one of (a) data changes in a vision system application, (b) invocation of other procedures that the vision system application provides, and (c) a data screen.

8. The system as set forth in claim 1 wherein the cells include multiple element types, having at least one of images, simple data values, and control constructs.

9. The system as set forth in claim 1 wherein data from the vision system is automatically sent to the HMI.

10. The system as set forth in claim 9 wherein a user input to the HMI is sent to the vision system.

11. The system as set forth in claim 1 wherein images from the one or more cameras are automatically displayed and scaled to fit inside a screen control on the HMI.

12. The system as set forth in claim 11 wherein, results of the vision system from vision tools are graphically drawn in the screen control on the HMI.

13. The system as set forth in claim 1, wherein the HMI generator is arranged to automatically generate metadata associated with the HMI element, the metadata corresponding to a parameter associated with the HMI element.

14. The system as set forth in claim 1, wherein automatic generation of the HMI by the HMI generator consists of:
    selecting at least one cell of the spreadsheet by the user; and
    executing a create command by the user.

15. The system of claim 1, further comprising a vision system controller interconnected on a network between a user device and a vision system camera processor, wherein data from the vision system controller is automatically sent from a user interface running in the web browser and user input to the user interface running in the web browser is automatically sent to the vision system controller.

16. A method for automatically generating a human-machine interface (HMI) for display on a screen of a user device for monitoring and controlling a vision system comprising the steps of:

inputting data representative of HMI elements in a spreadsheet in respective cells;

selecting a first grouping of cells in the spreadsheet; and operating an HMI generator that identifies a type of information associated with the first grouping of cells, determines at least one parameter to associate with the first grouping of cells, and places and scales at least one HMI element corresponding to the first grouping of cells in accordance with a layout of the first grouping of cells in the spreadsheet, the type of information, and the at least one parameter relative to the screen on the user device;

operating a web browser with the user device to view and manipulate the HMI such that, upon updating of the HMI, information is transmitted from the HMI to the spreadsheet and, upon updating of the spreadsheet, information is transmitted from the spreadsheet to the HMI.

17. The method as set forth in claim 16 wherein the HMI generator is located in an application instantiated within the user device and communicates through a vision system controller with a processor of a vision system camera that operates a spreadsheet.

18. A system for use in automatically generating a human-machine interface (HMI) in a vision system having one or more cameras, comprising:

a configuration process interacting with a user to automatically populate metadata associated with the HMI element and HMI tags from HMI elements entered in a spreadsheet by the user; and a vision system controller interconnected on a network between a user device and a vision system camera processor, the vision system controller including a tag manager that manages the HMI tags passing between the HMI and the vision system camera processor, an HMI including at least one graphical element configured to allow a user to control a camera and to display live information, comprising at least one runtime image, from the camera, wherein upon update of the control of the camera via the HMI, information is communicated to the vision system camera processor via the spreadsheet and wherein upon update of the spreadsheet, information is communicated to the HMI and the HMI is updated.

19. The system as set forth in claim 18 further comprising an HMI generator associated with the configuration process that communicates with the spreadsheet to determine types of HMI elements and data presented in cells of the spreadsheet that have been grouped by the user to configure an HMI screen on the user device.

* * * * *